United States Patent [19]
Hanset et al.

[11] 3,746,217
[45] July 17, 1973

[54] MEASURING SYSTEM

[76] Inventors: Euegne Hanset, 720 Capitola Road;
Richard E. Hanset, 510 Seaside St.,
both of Santa Cruz, Calif. 95060

[22] Filed: Sept. 7, 1971

[21] Appl. No.: 178,162

[52] U.S. Cl.................... 222/194, 73/422, 222/318, 302/48
[51] Int. Cl. .............................................. G01n 1/20
[58] Field of Search........................... 73/422, 423; 137/625.48; 222/194, 309, 318, 21; 302/48

[56] References Cited
UNITED STATES PATENTS

| | | | |
|---|---|---|---|
| 3,462,244 | 8/1969 | Leisey | 222/194 X |
| 1,660,149 | 2/1928 | Beadle | 222/318 X |
| 3,344,887 | 10/1967 | Lavengood | 222/194 X |

*Primary Examiner*—Samuel F. Coleman
*Assistant Examiner*—Thomas E. Kocovsky
*Attorney*—Eckhoff, Hoppe, Slick, Mitchell & Anderson

[57] ABSTRACT

A metering system is provided for catalysts and similar materials which must be precisely measured in small amounts by providing a double chambered valve whereby the catalyst can be kept in circulation at all times, preventing aeration and providing for accurate measurement into small portions. In a preferred embodiment of the invention, the catalyst chamber is made variable so that adjustments can be made in the volume dispensed.

2 Claims, 3 Drawing Figures

Patented July 17, 1973 3,746,217
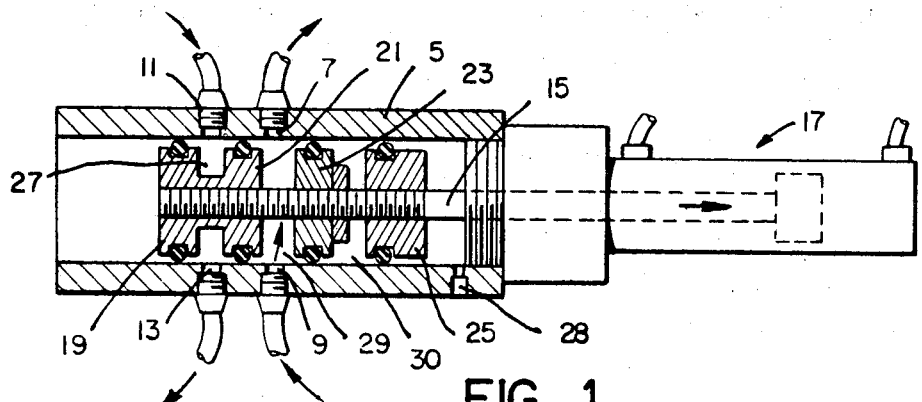
FIG_1
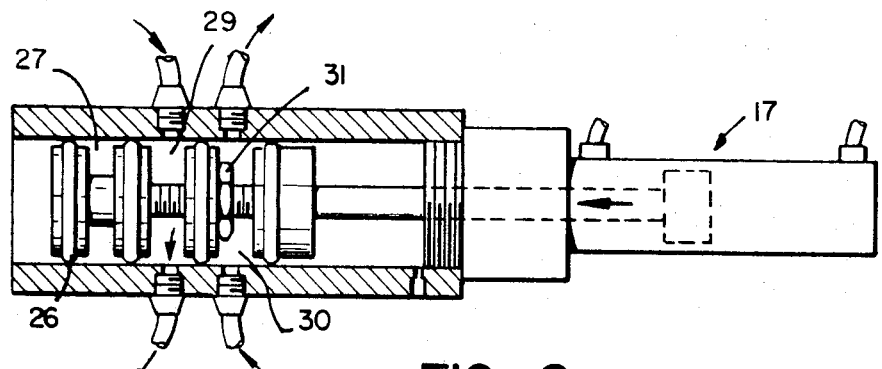
FIG_2
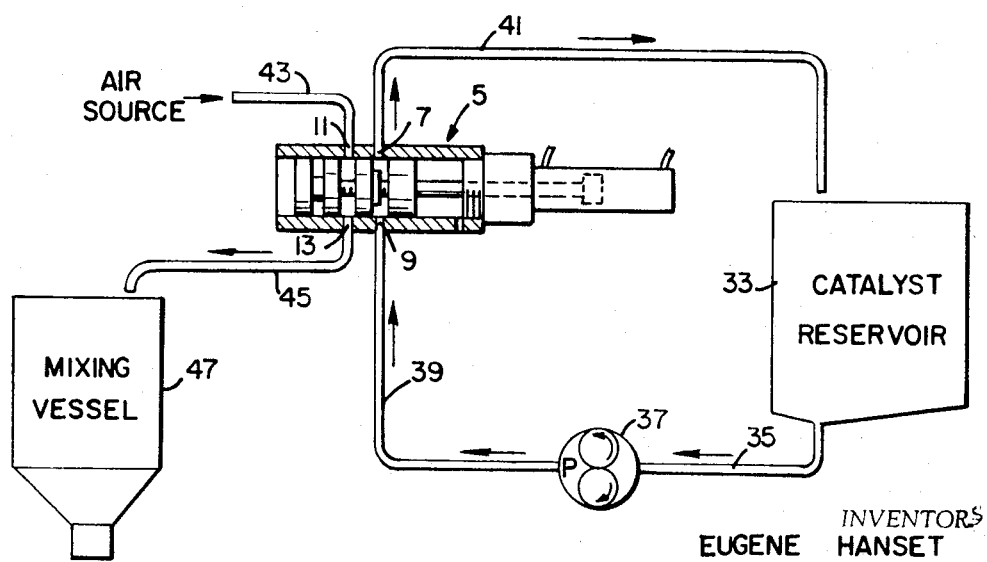
INVENTORS
EUGENE HANSET
RICHARD E. HANSET
FIG_3

MEASURING SYSTEM

SUMMARY OF THE INVENTION

In many chemical operations such as in the measurement of catalysts, it is desirable to provide for a metering valve whereby small amounts of the material can be metered out at intervals. The metering valves heretofore used have not been fully satisfactory for several reasons.

In some metering valves, the flow of catalyst is periodically shut off so that there is pressure in the catalyst line and if the catalyst aerates or otherwise breaks down, bubbles may form in the line which interfere with the accurate measurement of the catalyst.

A further difficulty with the systems heretofore used has been that the metering valve ordinarily discharges a small amount of fluid into a line and does not provide for positive means for emptying the line. Thus, it frequently has been necessary to locate the metering valve adjacent to the place where the catalyst is to be utilized.

In accordance with the present invention the above difficulties have been obviated by providing a metering valve and system wherein the valve has two main chambers, one of which can be considered as a measuring chamber, and the other as a circulating chamber. In a first position, catalyst flows through the measuring chamber in a continuous circuit filling the measuring chamber while providing for continued circulation. When it is desired to discharge the selected quantity of catalyst, the valve is moved to a second position whereupon the measuring chamber is brought into alignment with a discharge opening as well as a positive discharge fluid pressure, discharging the metered amount of catalyst into the line. While this is happening, the catalyst is continuously flowing through the other chamber so that at no time is the catalyst cut off from circulation.

The details of the operation and further advantages of the invention are set forth in the balance of the specification.

BRIEF DESCRIPTION OF THE DRAWINGS

FIG. 1 is a side view of a valve embodying the present invention, partly in section, showing the position of the parts while a quantity of catalyst is being measured.

FIG. 2 is a view similar to FIG. 1 showing the position of the parts while the catalyst is being discharged from the valve.

FIG. 3 is a diagrammatic view showing the valve of FIGS. 1 and 2, together with the associated equipment for dispensing a catalyst.

DESCRIPTION OF THE PREFERRED EMBODIMENTS

The valve includes a cylinder 5 having ports 7, 9, 11, and 13. The ports 7 and 9 are paired with each other and the ports 11 and 13 are similarly paired. Although the ports have been shown on opposite sides of the cylinder, this exact relationship is not necessary and each pair could be located at any points on a given circumference.

Mounted within the cylinder 5 is a piston rod 15 which is reciprocated by means of an air cylinder, or other suitable device, 17.

Mounted on the piston rod 15 are four pistons designated 19, 21, 23, and 25, each of which has a sealing ring as at 26. In the embodiment shown, the pistons 19 and 21 are formed from a single piece of metal but this is for manufacturing convenience only and they could be separately mounted on the piston rod. As will be later apparent, the piston 25 serves only as a sealing element and other sealing arrangements might be employed such as packing rings around the piston rod 15. A vent 28 is provided for the space beyond piston 25. It will be seen that a first chamber, designated 27, is thus formed between the pistons 19 and 21, a second chamber designated 29 is formed between the pistons 21 and 23 and a third chamber 30 is formed between pistons 23 and 25. The volume of the chamber 29 determines the volume of the catalyst which is to be discharged so that preferably the piston 23 is made adjustable as by threading it onto the shaft and it is locked in place by means of a lock nut 31. It is not necessary that the other pistons be adjustable and they can be fixed to the shaft 15 in any suitable manner such as threadably mounting them on the shaft followed by a swaging operation.

A typical catalyst metering system is shown in FIG. 3. Here a source of catalyst 33 is shown with a discharge line 35, leading to a gear pump 37 with the discharge going through line 39 to port 9 of the valve. Port 7 is connected through line 41 back to the catalyst reservoir 33. An air source, not illustrated, is provided on line 43 which leads to port 11 of the valve, while line 45 leads from port 13 to a mixing vessel 47 wherein the catalyst is introduced at the desired time together with other ingredients from sources not shown.

The operation of the system will now be described. In the position shown in FIG. 1, catalyst can freely circulate through the metering chamber 29 so that there is no restriction in the line and no chance of the catalyst forming air bubbles or the like due to standing. Air may constantly circulate through chamber 27 keeping the line 45 clear at all times and preventing any build-up in the line but the air supply may be intermittent and only applied during the discharge cycle. Now when it is desired to discharge a measured amount of catalyst, cylinder 17 is actuated to the position shown in FIG. 2 whereupon chamber 29 moves with its measured charge of catalyst between ports 11 and 13 whereupon the air blows the measured amount of catalyst out of chamber 27 through line 45 and into the mixing vessel 47. At the same time, chamber 30 is brought into alignment with ports 7 and 9 so the catalyst continues to circulate through this chamber, maintaining a constant flow of catalyst. Thus, there is no interruption in the flow of catalyst except possibly momentarily as the piston moves from one position to the other.

Many variations can be made in the exact structure shown and described without departing from the spirit of this invention. For instance, piston 23 has been shown as being variable but this can be fixed and the other pistons which are shown as being fixed can be made variable if this is desired. An air cylinder has been shown for actuating the system of the present invention but obviously other means might be employed. The piston 19 could be eliminated since it merely directs the flow of air through the line 45 when the valve is shown in the position of FIG. 1. In many instances, it would do no harm to discharge the air in the atmosphere rather than through line 45.

Although the system has been described in its preferred embodiment as one for measuring catalysts, it is obvious that this system might be used for making small incremental measurements with any fluid.

We claim:

1. A metering system for a catalyst or the like comprising in combination:
   a. a cylindrical valve body,
   a first pair of ports in said valve body,
   c. a second pair of ports in said valve body,
   d. each of said pairs of ports being located on a given circumference with one pair of ports spaced from the other,
   e. a piston rod within said cylinder with means for moving the rod between a first position and a second position,
   f. at least four pistons on said rod forming first, second and third chambers therebetween,
   g. said first chamber being in alignment with said first pair of ports when the piston rod is in the first position,
   h. said second chamber being in alignment with said second pair of ports when the piston rod is in the first position,
   i. said second chamber being in alignment with said first pair of ports when the piston rod is in said second position,
   j. said third chamber being in alignment with said second pair of ports when said piston rod is in said second position,
   k. circulating means for a first fluid through said first pair of ports and circulating means for a second fluid between said second pair of ports,
   l. whereby a charge of fluid is picked up by said first chamber when the piston rod is in the first position, is discharged from one of the second ports when the piston rod is in the second position and fluid circulates in said second chamber while the piston rod is in the second position and said fluid circulates in the first chamber when the piston rod is in first position.

2. The system of claim 1 wherein means are provided to adjust the volume of the first chamber.

* * * * *